(12) United States Patent
Mandic et al.

(10) Patent No.: US 9,378,297 B2
(45) Date of Patent: Jun. 28, 2016

(54) TASK-BASED ADDRESS BAR AND TABS SCALING

(75) Inventors: Mirko Mandic, Seattle, WA (US); Jane T. Kim, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 13/042,274

(22) Filed: Mar. 7, 2011

(65) Prior Publication Data
US 2012/0233566 A1 Sep. 13, 2012

(51) Int. Cl.
G06F 3/048 (2013.01)
G06F 17/30 (2006.01)
G06F 3/0483 (2013.01)

(52) U.S. Cl.
CPC ........ *G06F 17/30899* (2013.01); *G06F 3/0483* (2013.01)

(58) Field of Classification Search
CPC ... G06F 3/0483; G06F 3/0481; G06F 3/0237; G06F 17/30899
USPC .................. 715/777, 779, 788, 798, 800, 801
See application file for complete search history.

(56) References Cited

U.S. PATENT DOCUMENTS

| | | | | |
|---|---|---|---|---|
| 6,057,836 | A * | 5/2000 | Kavalam et al. | 715/779 |
| 6,874,126 | B1 | 3/2005 | Lapidous | |
| 2004/0030719 | A1 * | 2/2004 | Wei | 707/104.1 |
| 2006/0271858 | A1 * | 11/2006 | Yolleck et al. | 715/738 |
| 2007/0168886 | A1 * | 7/2007 | Hally et al. | 715/854 |
| 2008/0005686 | A1 | 1/2008 | Singh | |
| 2008/0077879 | A1 | 3/2008 | Black | |
| 2008/0141161 | A1 * | 6/2008 | Raven et al. | 715/777 |
| 2009/0164934 | A1 | 6/2009 | Bhattiprolu et al. | |
| 2009/0327947 | A1 * | 12/2009 | Schreiner et al. | 715/777 |
| 2010/0077344 | A1 | 3/2010 | Gaffney et al. | |
| 2011/0138313 | A1 * | 6/2011 | Decker et al. | 715/777 |
| 2011/0225506 | A1 * | 9/2011 | Casalaina et al. | 715/741 |
| 2011/0231499 | A1 | 9/2011 | Stovicek et al. | |
| 2012/0066635 | A1 * | 3/2012 | Kim et al. | 715/777 |

FOREIGN PATENT DOCUMENTS

| | | | |
|---|---|---|---|
| JP | 2002297278 | A | 10/2002 |
| JP | 2004086743 | A | 3/2004 |

OTHER PUBLICATIONS

"International Search Report", Mailed Date: Sep. 17, 2012, Application No. PCT/US2012/027644, Filed Date: Mar. 4, 2012, pp. 8.

(Continued)

*Primary Examiner* — Tadeese Hailu
(74) *Attorney, Agent, or Firm* — Bryan Webster; Raghu Chinagudabha; Micky Minhas

(57) ABSTRACT

Various embodiments provide a Web browser that includes an address bar and functionality that distributes one or more tabs along a line that is common to both the tabs and address bar. In at least some embodiments, one or more of the address bar or the tabs are dynamically resized based on a task context associated with a user's interaction with the Web browser. For example, when the task context is associated with a tab interaction, the address bar and/or tabs can be dynamically resized to enhance the user's tab experience. Likewise, when the task context is associated with an address bar interaction, the address bar and/or tabs can be dynamically resized to enhance a user's address bar experience.

20 Claims, 12 Drawing Sheets

(56) References Cited

OTHER PUBLICATIONS

Zheng, Long, "Behind the design of the Internet Explorer 9 chrome", Retrieved at<<http://www.istartedsomething.com/20100916/behind-the-design-of-internet-explorer-9-chrome/>>, Sep. 16, 2010, pp. 20.

Newman, Jared, "Internet Explorer 9 Beta: UI Smackdown", Retrieved at<<http://www.pcworld.com/article/205500/internet_explorer_9_beta_ui_smackdown.html>>, Sep. 15, 2010, pp. 9.

"Address Bar Improvements in Internet Explorer 8 Beta 1", Retrieved at <<http://blogs.msdn.com/b/ie/archive/2008/03/11/address-bar-improvements-in-internet-explorer-8-beta-1.aspx>>, Mar. 11, 2008, pp. 36.

"Killer Feature of Google Chrome; UI for Closing Tabs", Retrieved at<<http://www.bytehood.com/killer-feature-of-google-chrome-ui-for-closing-tabs/164/>>, Jan. 13, 2011, pp. 2.

Martin, "Firefox: Show Mouse Over URLs in the Firefox Address Bar", Retrieved at<<http://www.ghacks.net/2009/10/13/firefox-show-mouse-over-urls-in-the-firefox-address-bar/>>, Oct. 13, 2009, pp. 11.

"Foreign Office Action", AU Application No. 2012225705, Jan. 16, 2015, 3 pages.

"Foreign Office Action", AU Application No. 2012225705, Mar. 24, 2015, 5 pages.

"Extended European Search Report", EP Application No. 12754695.0, Oct. 7, 2014, 7 pages.

"Office Action Issued in Japanese Patent Application No. 2013-557776", Mailed Date: Mar. 1, 2016, 3 Pages.

\* cited by examiner

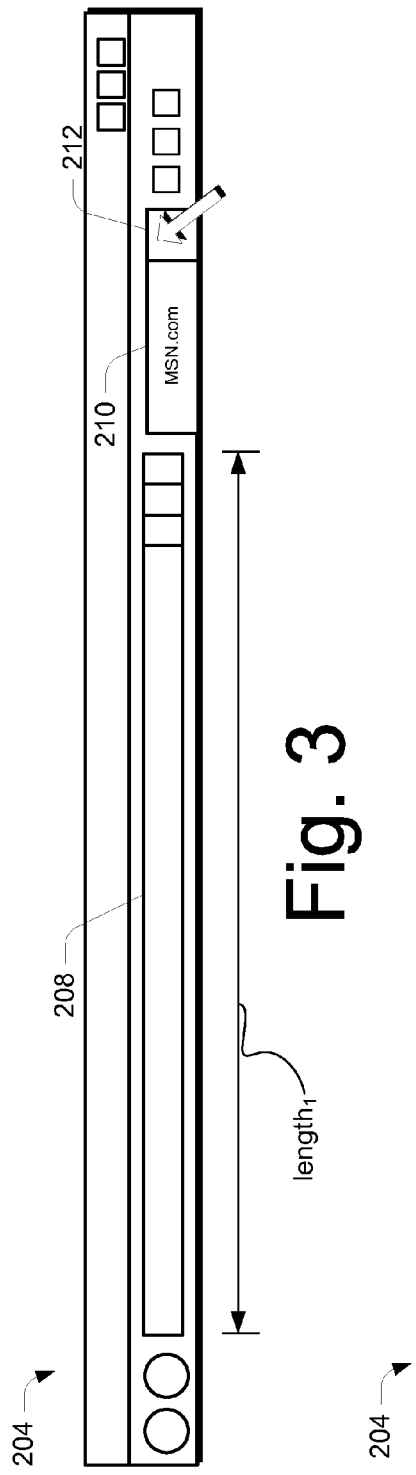
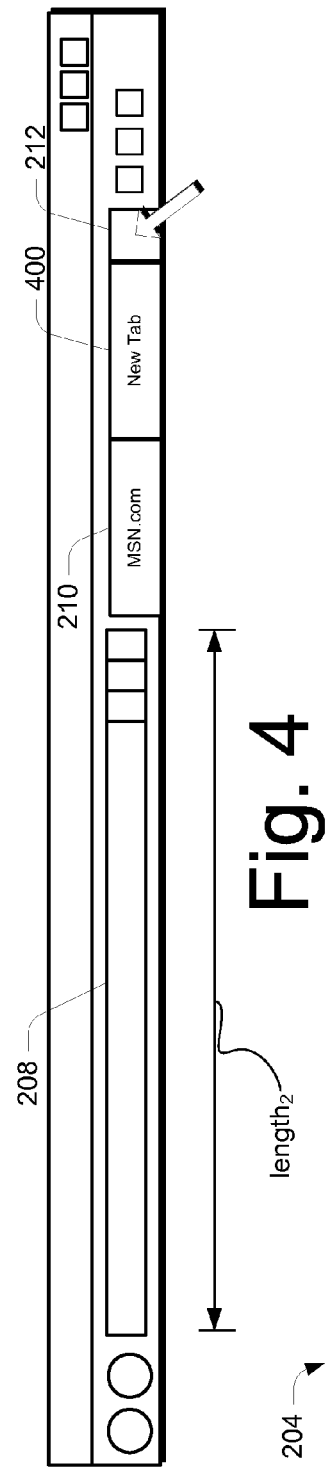
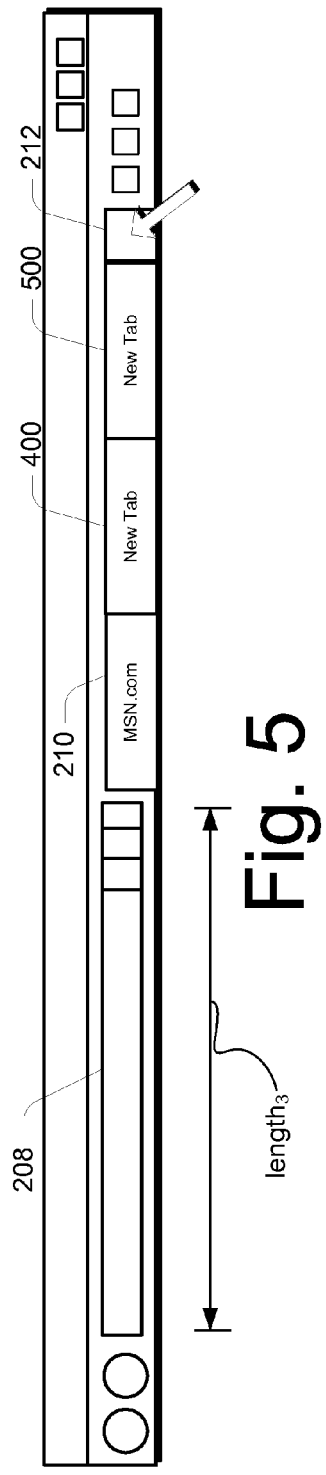

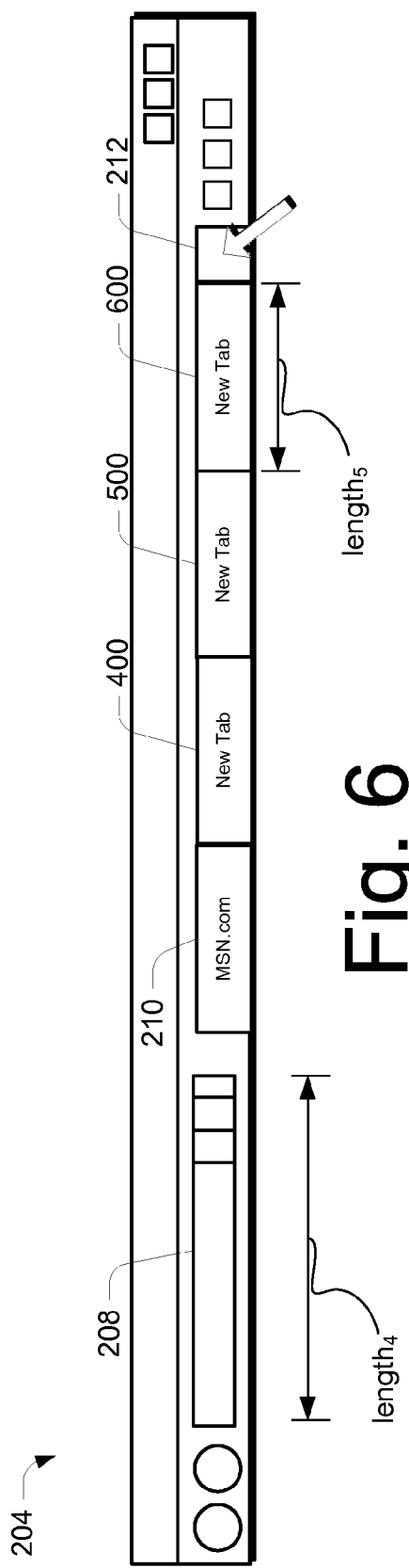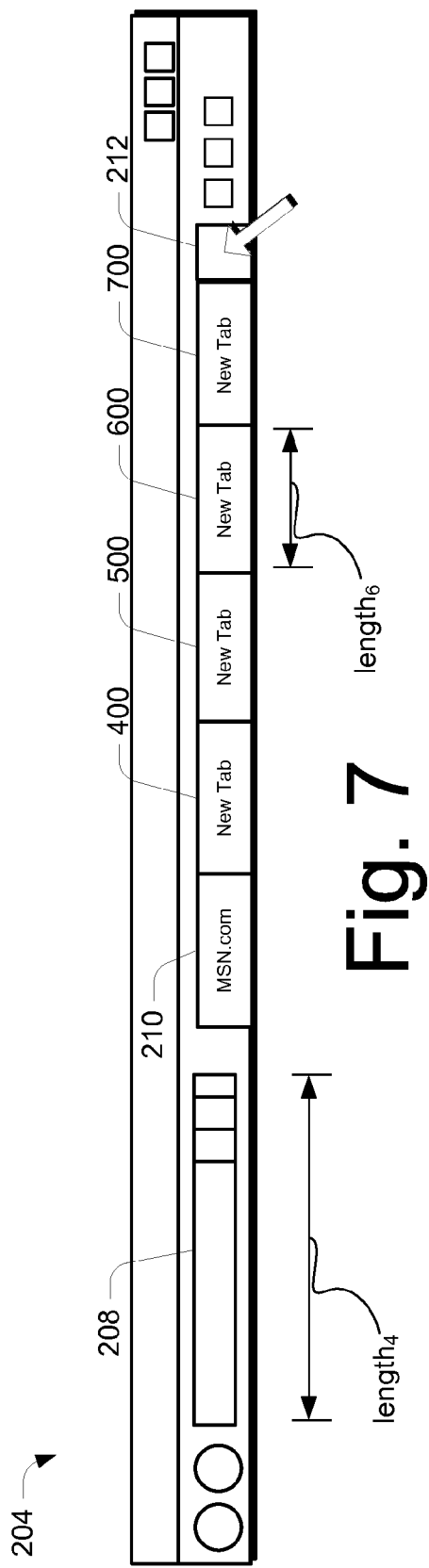

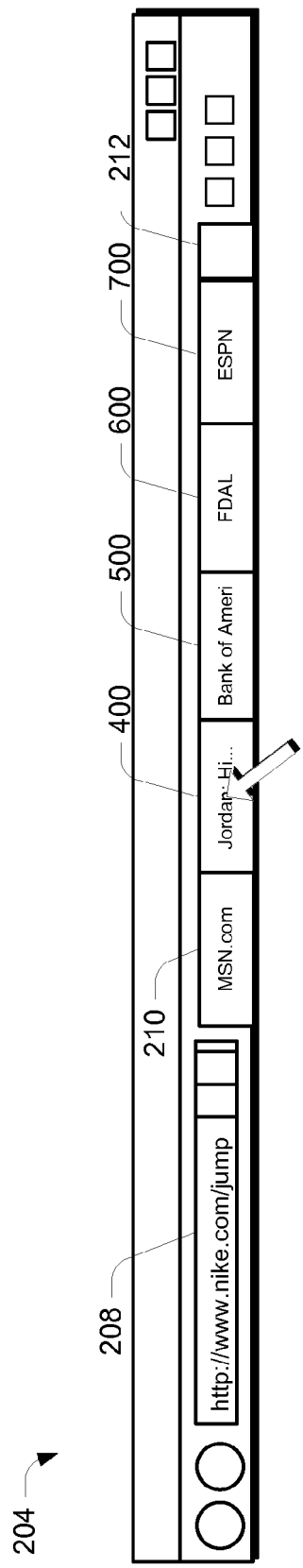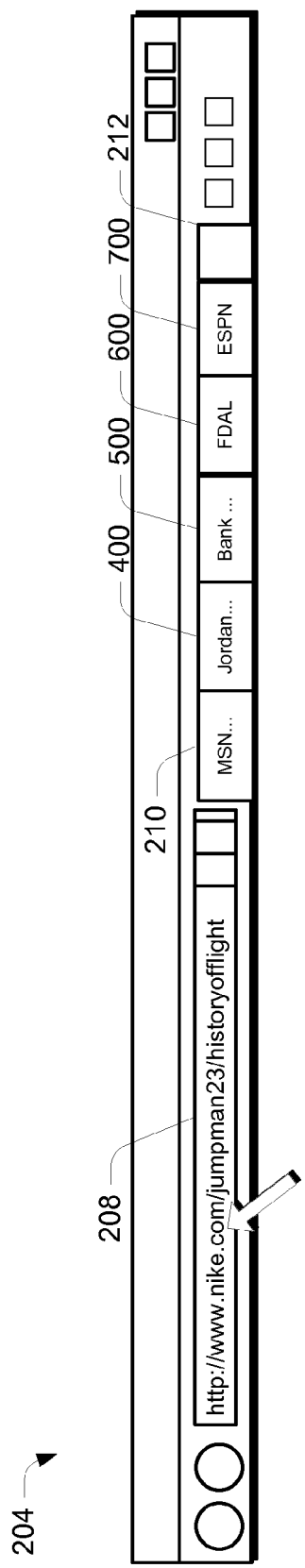

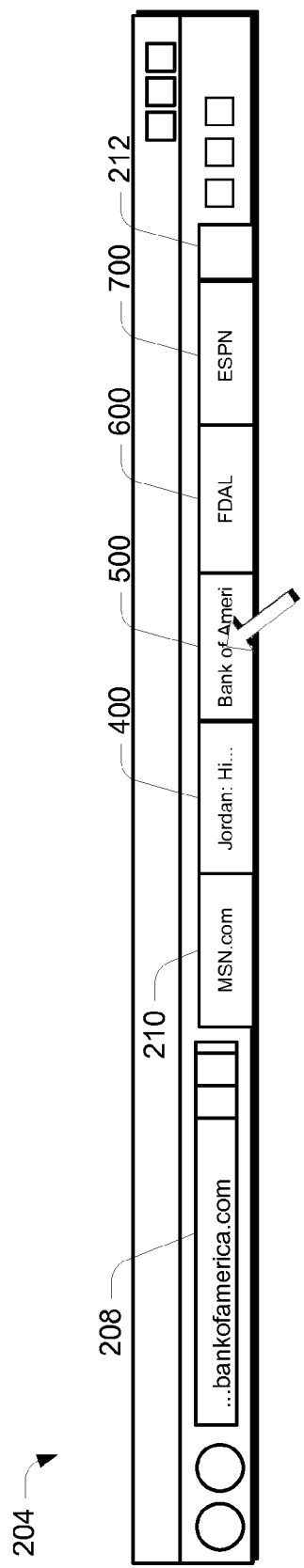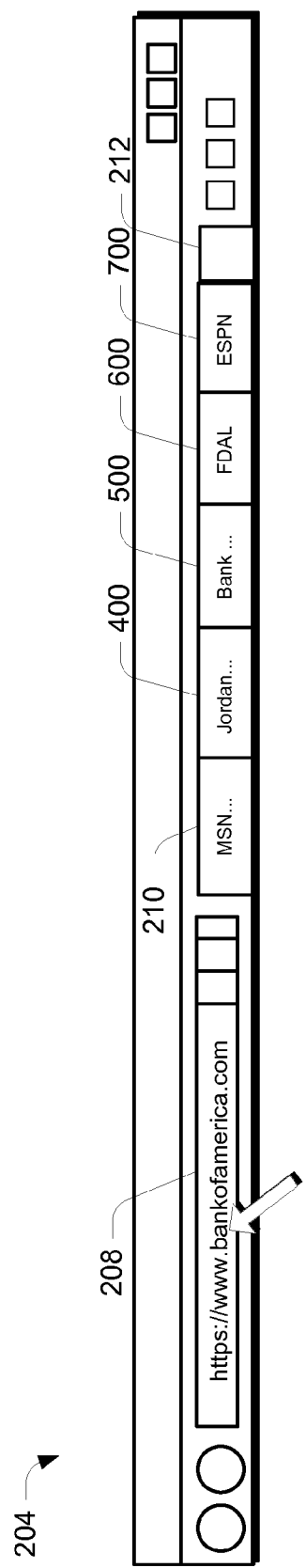

TASK-BASED ADDRESS BAR AND TABS SCALING

BACKGROUND

As web browsers evolve, focus continues to be placed on enhancing a user's experience as they interact with the Web browser. Typically, enhancing a user's experience can include enhancing the user's visual experience as they navigate to different sites, consume content, and interact with a Web browser's various instrumentalities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a Web browser that includes an address bar and functionality that distributes one or more tabs along a line that is common to both the tabs and address bar. In at least some embodiments, one or more of the address bar or the tabs are dynamically resized based on a task context associated with a user's interaction with the Web browser. For example, when the task context is associated with a tab interaction, the address bar and/or tabs can be dynamically resized to enhance the user's tab experience. Likewise, when the task context is associated with an address bar interaction, the address bar and/or tabs can be dynamically resized to enhance a user's address bar experience.

BRIEF DESCRIPTION OF THE DRAWINGS

The same numbers are used throughout the drawings to reference like features.

FIG. 3 illustrates an example control layout area of the FIG. 2 web browser user interface in accordance with one or more embodiments.

FIG. 4 illustrates an example control layout area of the FIG. 2 web browser user interface in accordance with one or more embodiments.

FIG. 5 illustrates an example control layout area of the FIG. 2 web browser user interface in accordance with one or more embodiments.

FIG. 6 illustrates an example control layout area of the FIG. 2 web browser user interface in accordance with one or more embodiments.

FIG. 7 illustrates an example control layout area of the FIG. 2 web browser user interface in accordance with one or more embodiments.

FIG. 11 illustrates an example control layout area of the FIG. 2 web browser user interface in accordance with one or more embodiments.

FIG. 12 illustrates an example control layout area of the FIG. 2 web browser user interface in accordance with one or more embodiments.

FIG. 13 illustrates an example control layout area of the FIG. 2 web browser user interface in accordance with one or more embodiments.

FIG. 14 illustrates an example control layout area of the FIG. 2 web browser user interface in accordance with one or more embodiments.

DETAILED DESCRIPTION

Overview

Various embodiments provide a Web browser that includes an address bar and functionality that distributes one or more tabs along a line that is common to both the tabs and address bar. In at least some embodiments, one or more of the address bar or the tabs are dynamically resized based on a task context associated with a user's interaction with the Web browser. For example, when the task context is associated with a tab interaction, the address bar and/or tabs can be dynamically resized to enhance the user's tab experience. Likewise, when the task context is associated with an address bar interaction, the address bar and/or tabs can be dynamically resized to enhance a user's address bar experience.

In the discussion that follows, a section entitled "Operating Environment" is provided and describes one environment in which one or more embodiments can be employed. Following this, a section entitled "Example Task-based Address Bar/Tabs Scaling" describes various scaling operations in accordance with one or more embodiments. Last, a section entitled "Example System" describes an example system that can be utilized to implement one or more embodiments.

Consider now an example operating environment in which one or more embodiments can be implemented.

Operating Environment

Figure 1:
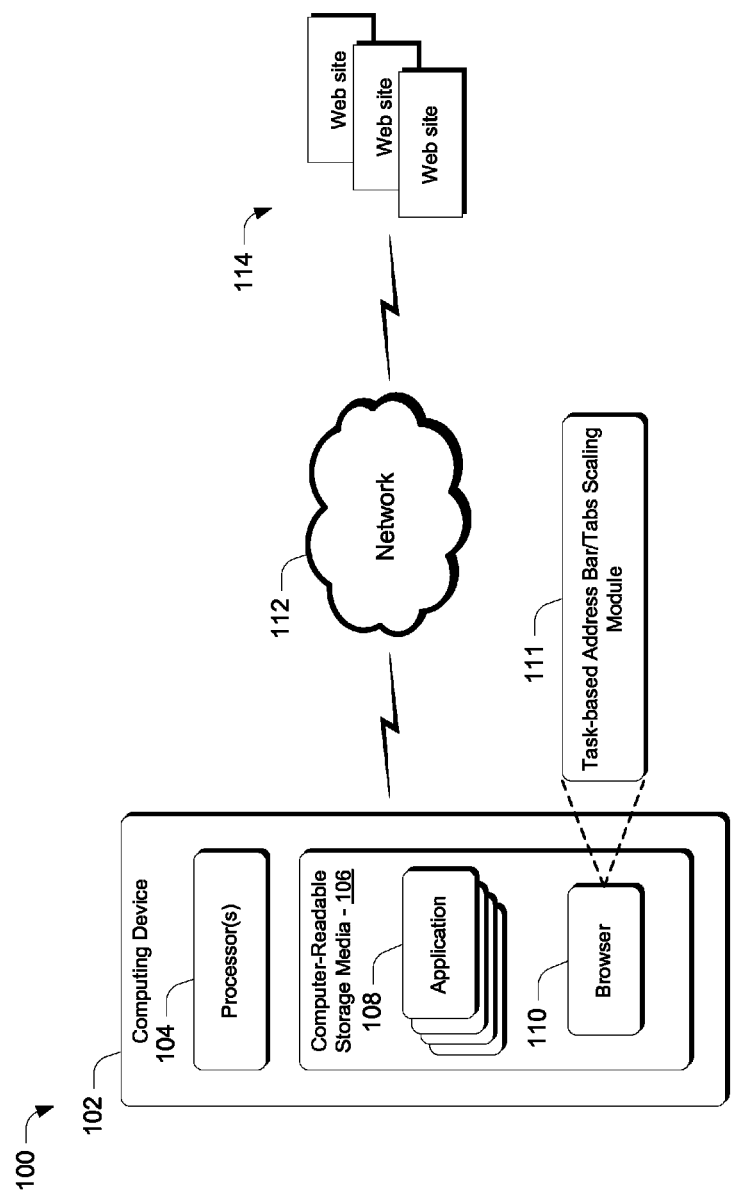
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 20.

In addition, computing device 102 includes a software application in the form of a web browser 110. Any suitable web browser can be used examples of which are available from the assignee of this document and others. In addition, computer-readable storage media 106 can include a task-based address bar/tabs scaling module 111 that operates as described above and below.

In one or more embodiments, web browser 110 includes an address bar and functionality that distributes one or more tabs along a line that is common to both the tabs and address bar. In at least some embodiments, the task-based address bar/tabs scaling module 111 is operable to dynamically resize one or more of the address bar or the tabs based on a task context associated with a user's interaction with the web browser, such as moving focus to or away from the tabs, to or away from the address bar, or to an associated web page. For example, when the task context is associated with a tab interaction, the address bar and/or tabs can be dynamically resized to enhance the user's tab experience. Likewise, when the task context is associated with an address bar interaction, the address bar and/or tabs can be dynamically resized to enhance a user's address bar experience. Similarly, when the task context is associated with shifting focus to a web page, the address bar and/or tabs can be dynamically resized to enhance the user's web page experience, as by reducing the size of the address bar and/or tabs. Further visual manipulations of the either or both the address bar or tabs can occur based on the task context.

Task-based address bar/tabs scaling module 111 can be implemented as a standalone component that is utilized by web browser 110. Alternately or additionally, the task-based address bar/tabs scaling module 111 can be implemented as part of web browser 110.

In addition, environment 100 includes a network 112, such as the Internet, and one or more web sites 114 from and to which content can be received and sent. Such content can include any suitable type of content that can be received from and sent to the web sites.

Computing device 102 can be embodied as any suitable computing device such as, by way of example and not limitation, a desktop computer, a portable computer, a netbook, a handheld computer such as a personal digital assistant (PDA), cell phone, and the like.

Having described an example operating environment, consider now a discussion of functionality associated with task-based address bar/tabs scaling module 111.

Example Task-Based Address Bar/Tabs Scaling

The discussion that follows starts first with a description of an example web browser and its associated user interface. Following this, a discussion of various embodiments of the task-based address bar/tabs scaling module 111 is provided to illustrate how task-based, dynamic resizing operations can occur.

Figure 2:
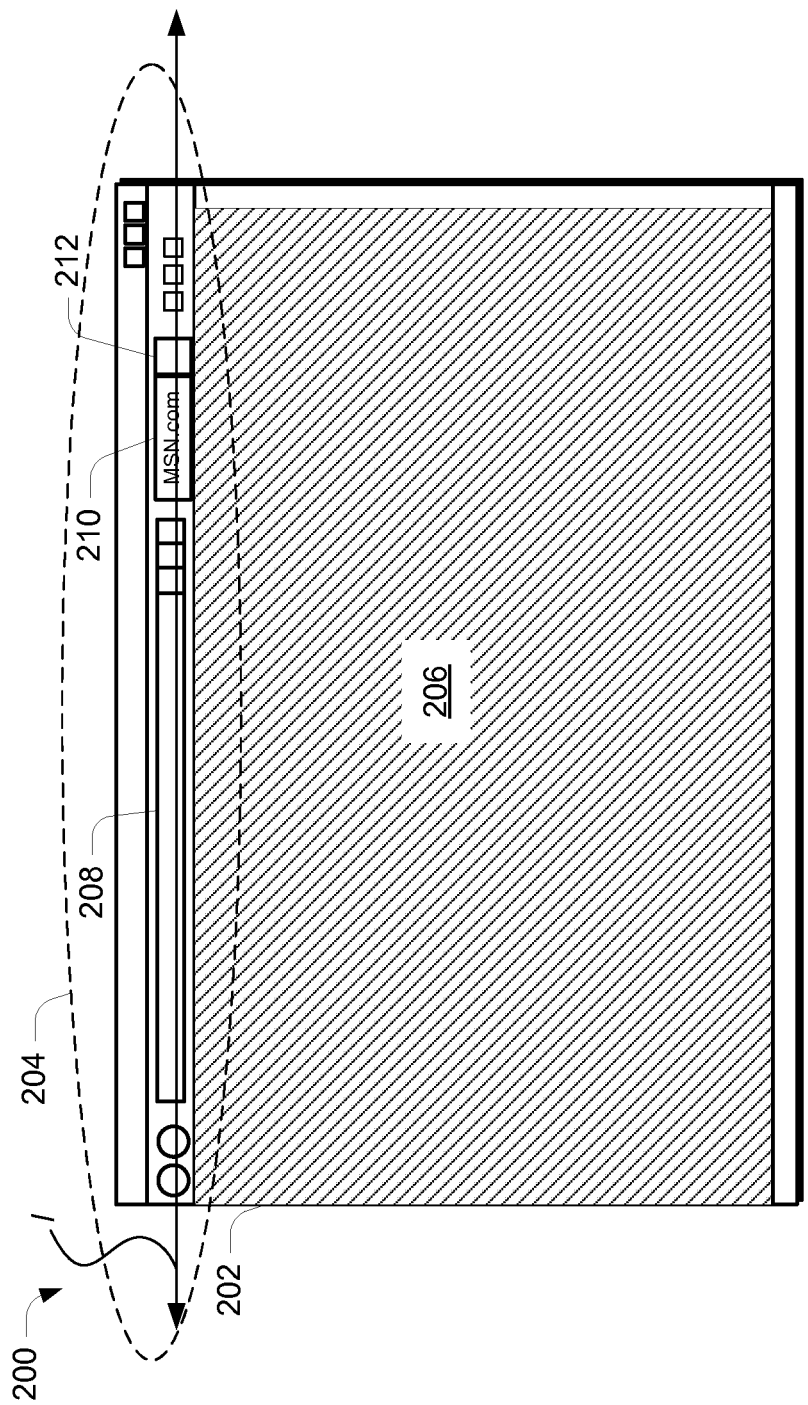
FIG. 2 illustrates an example web browser user interface in accordance with one or more embodiments.

FIG. 2 illustrates an example web browser generally at 200 in accordance with one or more embodiments. In this particular example, web browser 200 includes a web browser user interface 202 which, in turn, includes a control layout area 204 adjacent and above a content rendering area 206.

The control layout area 204 includes, among other components, an address bar 208, one or more tabs 210, and a new tab button 212 for opening additional tabs. In this example, address bar 208, tab 210 and new tab button 212 are disposed along a single or common line l within the control layout area 204. The control layout area 204 is designed to assist users in focusing on a website's content, such as that rendered within content rendering area 206, while removing some of the distractions that can be provided by controls. For example, the web browser user interface can also include, in at least some embodiments, a subset of selected controls distributed along the single or common line l such as forward and backward buttons, as well as other controls. The embodiments described herein are designed to respect a user's intent with respect to their interaction with the web browser and, more particularly, the address bar, tabs, and/or associated web pages. Various embodiments efficiently utilize space in which the address bar and tabs are presented, thus providing a visually-continuous, regular user experience that is generally devoid of discontinuities that can occur when a portion of a row of user interface is not filled.

Consider now a discussion of address bar/tabs scaling in accordance with one or more embodiments.

Address Bar/Tabs Scaling

FIG. 3 illustrates a larger view of control layout area 204 isolated and separated from content rendering area 206 (FIG. 2), in accordance with one or more embodiments. Like numerals from the FIG. 2 example are utilized to depict like components in the description that follows.

In one or more embodiments, address bar 208 can be dynamically resized or scaled in accordance with the task context associated with a user's interaction with the tabs. In the illustration, address bar 208 has a length represented by $length_1$. The user has placed their cursor over the new tab button 212 and clicked on it to open a new tab. As an example, consider FIG. 4.

There, a new tab 400 has been opened and is inserted between tab 210 and new tab button 212. Notice also that address bar 208 has been scaled in size to accommodate the new tab 400. As a result, the address bar 208 has been scaled or re-sized and now has a new shorter length represented by $length_2$. Continuing, assume now that the user opens an additional tab.

In FIG. 5, the user has placed their cursor over the new tab button 212 and opened an additional tab 500. Notice that address bar 208 has been scaled in size to accommodate the new tab 500. As a result, the address bar 208 has a new shorter length represented by $length_3$.

In FIG. 6, the user has opened an additional tab 600 and, as a result, address bar 208 has been scaled in size to accommodate the new tab 600. As a result, the address bar 208 has a new shorter length represented by $length_4$.

In one or more embodiments, a minimum length can be set for the address bar so that the address bar is not scaled down to be too small. Any suitable minimum length can be utilized, e.g. 220 pixels. One consideration that can be taken into account in deciding the minimum length of the address bar is the number of full-sized tabs that users, on average, tend to open at any one time. In at least some embodiments, four or five full-sized tabs can be utilized as a metric to facilitate defining the address bar's minimum length.

In embodiments where there is a minimum length for the address bar, if the user continues to open additional tabs, the tabs can be scaled down in size. For example, notice in FIG. 6 that new tab 600 has a length represented by $length_5$ which represents the length of a full-sized tab. Now, in FIG. 7, the user has opened an additional tab 700. Notice, however, that new tab 600 (as well as the other tabs) now has a length represented by $length_6$ which is shorter than $length_5$. The length of the address bar, however, remains the same at $length_4$. In one or more embodiments, all of the tabs can be scaled to the same length. Alternately or additionally, less than all of the tabs can be scaled.

Figure 8:
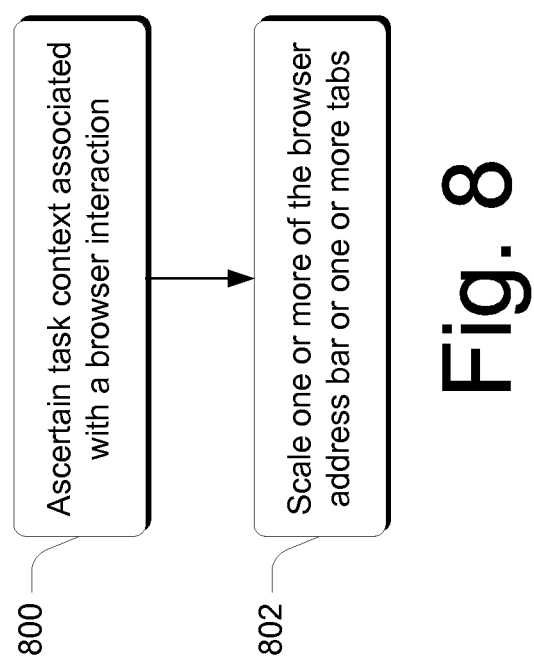
FIG. 8 is a flow diagram that describes steps in a method in accordance with one or more embodiments.

FIG. 8 is a flow diagram that describes steps in a method in accordance with one or more embodiments. The method can be performed in connection with any suitable hardware, software, firmware, or combination thereof. In at least some embodiments, the method can be performed by a suitably-configured task-based address bar/tabs scaling module, such as the one described above.

Step 800 ascertains a task context associated with a browser interaction. Any suitable task contexts can be ascertained, examples of which are provided above and below. Further, task contexts can include re-sizing the window within which the browser user interface is rendered and/or moving focus to an associated web page and away from the tabs or address bar. Responsive to ascertaining the task context, step 802 scales one or more of the browser's address bar, or one or more tabs. Examples of how this can be done are provided above.

Figure 9:
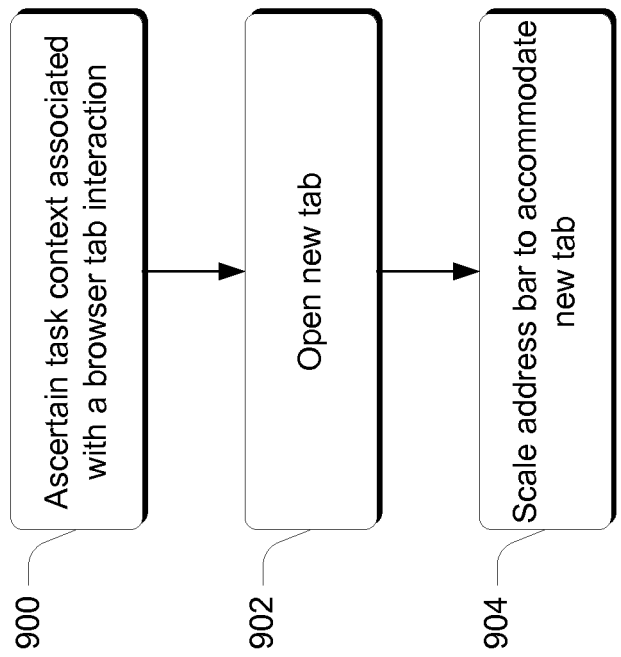
FIG. 9 is a flow diagram that describes steps in a method in accordance with one or more embodiments.

FIG. 9 is a flow diagram that describes steps in a method in accordance with one or more embodiments. The method can be performed in connection with any suitable hardware, software, firmware, or combination thereof. In at least some embodiments, the method can be performed by a suitably-configured task-based address bar/tabs scaling module, such as the one described above.

Step 900 ascertains a task context associated with a browser tab interaction. Any suitable browser tab interaction can be utilized. For example, in at least some embodiments, the browser tab interaction comprises selecting a new tab button in order to open a new tab. Step 902 opens a new tab in the browser, and step 904 scales the browser's address bar to accommodate the new tab. Examples of how this can be done are provided above.

Figure 10:
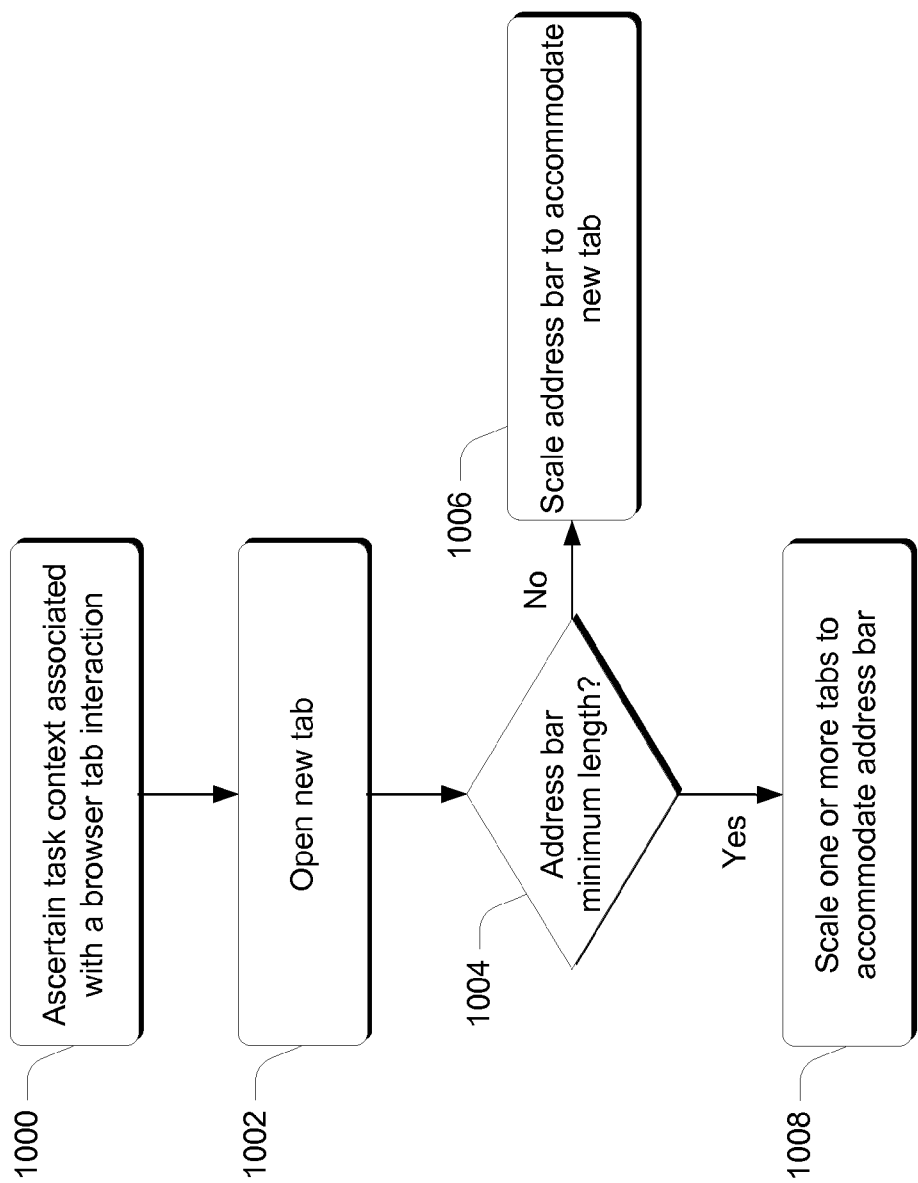
FIG. 10 is a flow diagram that describes steps in a method in accordance with one or more embodiments.

FIG. 10 is a flow diagram that describes steps in a method in accordance with one or more embodiments. The method can be performed in connection with any suitable hardware, software, firmware, or combination thereof. In at least some embodiments, the method can be performed by a suitably-configured task-based address bar/tabs scaling module, such as the one described above.

Step 1000 ascertains a task context associated with a browser tab interaction. Any suitable browser tab interaction can be utilized. For example, in at least some embodiments, the browser tab interaction comprises selecting a new tab button in order to open a new tab. Step 1002 opens a new tab in the browser and step 1004 ascertains whether the address bar has been scaled to a minimum length. If the address bar has not been scaled to the minimum length, then step 1006 scales the address bar to accommodate the new tab. If, on the other hand, the address bar has been scaled to the minimum length, step 1008 scales one or more tabs to accommodate the address bar. Examples of how this can be done are provided above.

Having described address bar/tabs scaling, consider now discussion of the various types of address bar/tab manipulations in accordance with one or more embodiments.

Address Bar/Tab Manipulations

The discussion that follows describes various task contexts and how the task contexts can cause address bar and/or tab manipulation in the form of dynamic resizing. Like numerals from the above-described embodiments are utilized to depict like components.

FIG. 11 illustrates address bar 208 and a plurality of tabs that have been opened including tabs 210, 400, 500, 600, and 700. Notice that address bar 208 has been scaled to accommodate the tabs. Notice also that a user has placed their cursor over tab 400 and clicked. As a result, a partial or truncated URL associated with tab 400 is displayed in address bar 208. In this example, because the user has placed focus on the tabs, an assumption is made that the user is more interested in the tabs and their associated content or labels, than information that is conveyed by the address bar. As such, a size-reduced address bar can be utilized to facilitate the user's experience and respect their perceived intent with respect to the tabs.

Consider now FIG. 12 in which the user has now moved focus away from the tabs and placed focus on address bar 208 by moving their cursor over the address bar and/or clicking into the address bar. In this example, because the user has placed focus on the address bar, the address bar has been expanded to display the full URL associated with the user's current tab. In addition to scaling up or expanding the length of the address bar, the individual tabs 210, 400, 500, 600, 700 have been scaled down in length to accommodate the expanded address bar. Here, because the user has placed focus on the address bar, an assumption is made that the user is more interested in the content within the address bar rather than content associated with the tabs. As such, the tabs can be scaled down in size to accommodate the expanded address bar.

FIG. 13 illustrates a situation in which the user has moved focus from the address bar to tab 500 and, correspondingly, a truncated URL is displayed in the size-scaled address bar 208. In this particular example, the URL has been truncated from the left to show the URL's domain. Doing so assists the user in understanding their navigation context and orienting himself or herself. Further, doing so can provide additional security assurance by informing the user of the domain to which they have navigated. In FIG. 14, the user has placed focus on address bar 208 and, correspondingly, the address bar 208 has been expanded to display the entire URL. In addition, the individual tabs have been scaled down in size to accommodate the expanded address bar.

Figure 15:
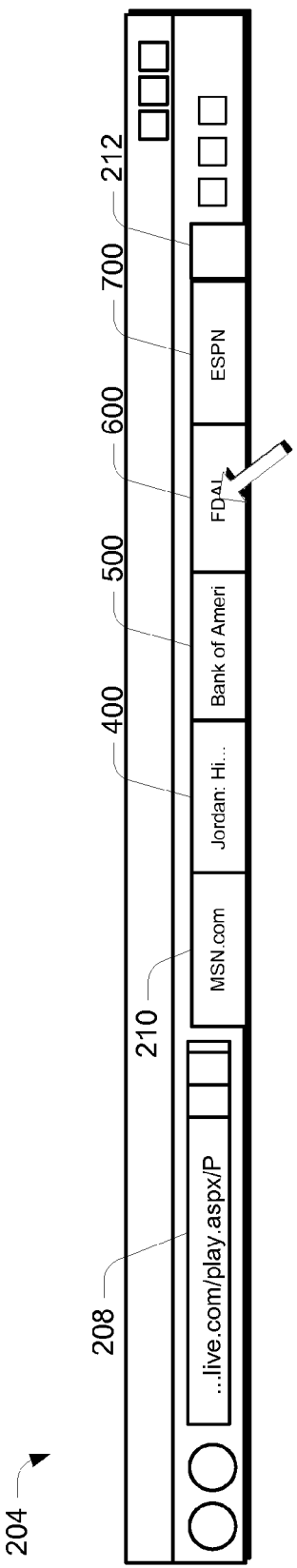
FIG. 15 illustrates an example control layout area of the FIG. 2 web browser user interface in accordance with one or more embodiments.
Figure 16:
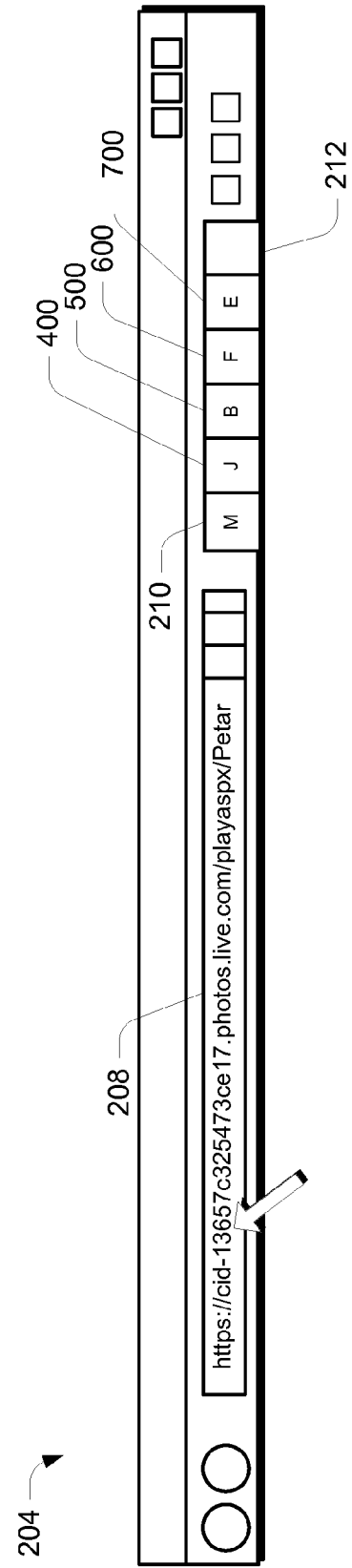
FIG. 16 illustrates an example control layout area of the FIG. 2 web browser user interface in accordance with one or more embodiments.

FIG. 15 further illustrates a situation in which the user has placed focus on tab 600 as by clicking on the tab, and address bar 208 has been scaled down in size. Further, address bar 208 includes a partial URL that has been truncated from the left to display an associated domain. In FIG. 16, the user has placed focus on address bar 208 and, as a result, the address bar has been expanded to include the entire URL. Notice also that because of the length of the URL, the tabs have been scaled down to less than about half the size of the tabs in FIG. 15.

Figure 17:
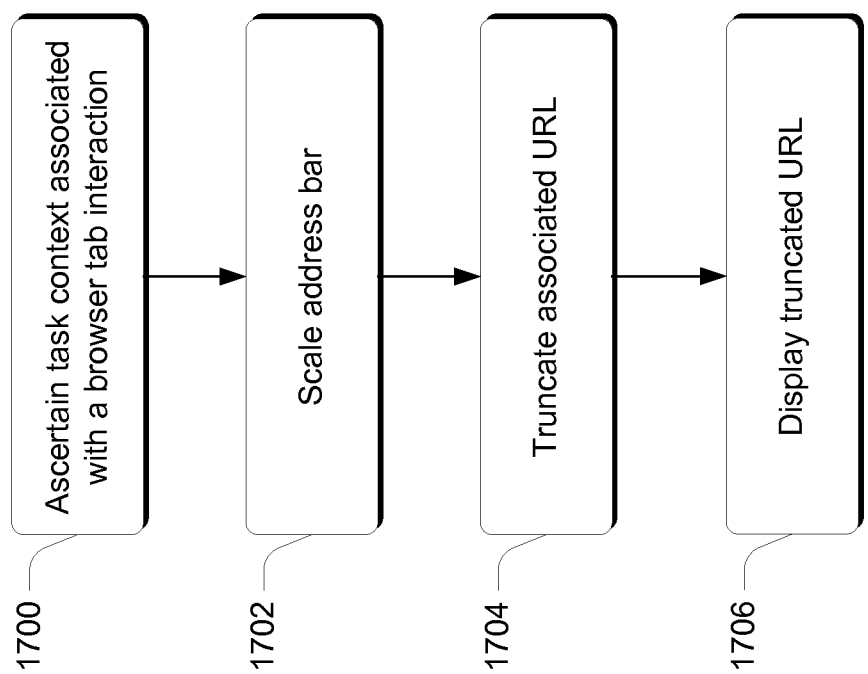
FIG. 17 is a flow diagram that describes steps in a method in accordance with one or more embodiments.

FIG. 17 is a flow diagram that describes steps in a method in accordance with one or more embodiments. The method can be performed in connection with any suitable hardware, software, firmware, or combination thereof. In at least some embodiments, the method can be performed by a suitably-configured task-based address bar/tabs scaling module, such as the one described above.

Step 1700 ascertains a task context associated with a browser tab interaction. Any suitable type of browser tab interaction can be utilized. For example, a browser tab interaction can include, by way of example and not limitation, placing focus on a particular tab. Responsive to ascertaining the task context associated with the browser tab interaction, step 1702 scales the address bar and step 1704 truncates an associated URL. Examples of how this can be done are provided above. Step 1706 displays the truncated URL in the scaled address bar.

Figure 18:
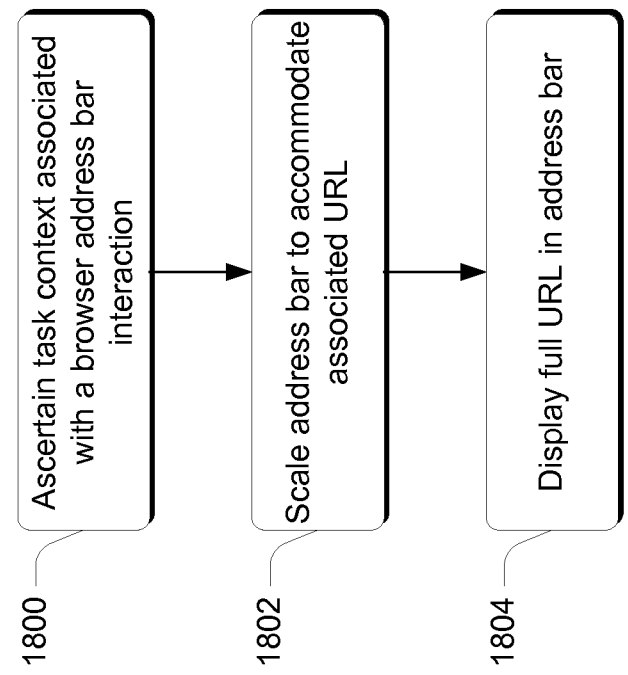
FIG. 18 is a flow diagram that describes steps in a method in accordance with one or more embodiments.

FIG. 18 is a flow diagram that describes steps in a method in accordance with one or more embodiments. The method can be performed in connection with any suitable hardware, software, firmware, or combination thereof. In at least some embodiments, the method can be performed by a suitably-configured task-based address bar/tabs scaling module, such as the one described above.

Step 1800 ascertains a task context associated with a browser address bar interaction. Any suitable browser address bar interaction can be utilized. For example, the browser address bar interaction can include, by way of example and not limitation, placing focus in the address bar. Responsive to the browser address bar interaction, step 1802 scales the address bar to accommodate an associated URL. In this example, the address bar is scaled so that it can display the full URL. It is to be appreciated and understood that because URL lengths can vary, so too can the scaled length of the address bar. Step 1804 displays the full URL in the address bar.

Figure 19:
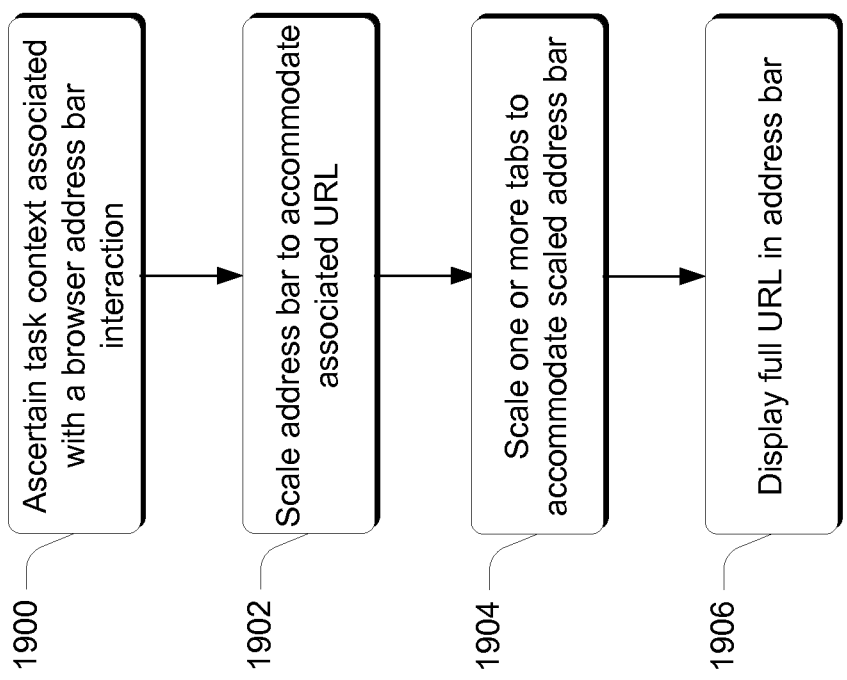
FIG. 19 is a flow diagram that describes steps in a method in accordance with one or more embodiments.

FIG. 19 is a flow diagram that describes steps in a method in accordance with one or more embodiments. The method can be performed in connection with any suitable hardware, software, firmware, or combination thereof. In at least some embodiments, the method can be performed by a suitably-configured task-based address bar/tabs scaling module, such as the one described above.

Step 1900 ascertains a task context associated with a browser address bar interaction. Any suitable browser address bar interaction can be utilized. For example, the browser address bar interaction can include, by way of example and not limitation, placing focus in the address bar. Responsive to the browser address bar interaction, step 1902 scales the address bar to accommodate an associated URL. In this example, the address bar is scaled so that it can display the full URL. Step 1904 scales one or more tabs to accommodate the scaled address bar. Examples of how this can be done are provided above. Step 1906 displays the full URL in the address bar.

Example System

Figure 20:
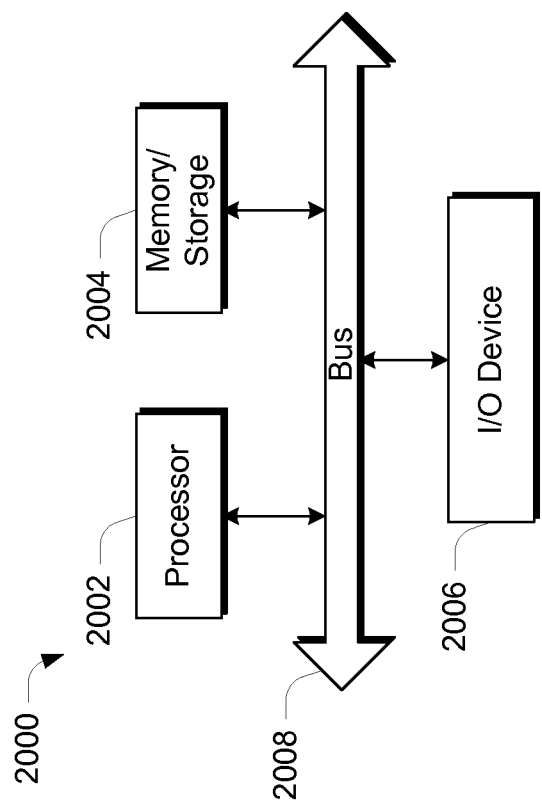
FIG. 20 illustrates an example system that can be utilized to implement one or more embodiments.

FIG. 20 illustrates an example computing device 2000 that can be used to implement the various embodiments described above. Computing device 2000 can be, for example, computing device 102 of FIG. 1 or any other suitable computing device.

Computing device 2000 includes one or more processors or processing units 2002, one or more memory and/or storage components 2004, one or more input/output (I/O) devices 2006, and a bus 2008 that allows the various components and devices to communicate with one another. Bus 2008 represents one or more of any of several types of bus structures, including a memory bus or memory controller, a peripheral bus, an accelerated graphics port, and a processor or local bus using any of a variety of bus architectures. Bus 2008 can include wired and/or wireless buses.

Memory/storage component 2004 represents one or more computer storage media. Component 2004 can include volatile media (such as random access memory (RAM)) and/or nonvolatile media (such as read only memory (ROM), Flash memory, optical disks, magnetic disks, and so forth). Component 2004 can include fixed media (e.g., RAM, ROM, a fixed hard drive, etc.) as well as removable media (e.g., a Flash memory drive, a removable hard drive, an optical disk, and so forth).

One or more input/output devices 2006 allow a user to enter commands and information to computing device 2000, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments provide a Web browser that includes an address bar and functionality that distributes one or more tabs along a line that is common to both the tabs and address bar. In at least some embodiments, one or more of the address bar or the tabs are dynamically resized based on a task context associated with a user's interaction with the Web browser. For example, when the task context is associated with a tab interaction, the address bar and/or tabs can be dynamically resized to enhance the user's tab experience. Likewise, when the task context is associated with an address bar interaction, the address bar and/or tabs can be dynamically resized to enhance a user's address bar experience.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable hardware storage devices comprising computer-executable instructions that are executable to configure a computer system to distribute a first portion of available space of a control layout area to an address bar that displays a uniform resource locator (URL), and distribute a second portion of the available space to one or more tabs, the address bar and the one or more tabs being disposed along a common line within the control layout area, the computer-executable instructions including instructions that are executable to configure the computer system to perform at least the following:

responsive to a first ascertained interaction being with the one or more tabs, perform at least the following:
  determine that the first portion of the available space is to be a first length equaling a predetermined minimum length of the address bar, the minimum width being selected to enable display of a truncated portion of the URL;
  determine that the second portion of the available space is to be a second length equaling the available length less the first length;
  display the address bar including the truncated portion of the URL within the first portion of the available space, the address bar having the first length; and
  display the one or more tabs within the second portion of the available space, each of the one or more tabs being visibly distributed within the second length, a particular tab of the one or more tabs having a particular length based on being distributed within the second length; and responsive to a second ascertained interaction being with the address bar, perform at least the following:
  determine that the first portion of the available space is to be a third length that is greater than the predetermined minimum length of the address bar and that permits display of greater than the truncated portion of the URL;
  determine that the second portion of the available space is to be a fourth length equaling the available length less than the third length, the fourth length being less than the second length;
  display the address bar including greater than the truncated portion of the URL within the first portion of the available space, the address bar having the third length; and
  display the one or more tabs within the second portion of the available space, each of the one or more tabs being visibly distributed within the fourth length, the particular tab being narrower than the particular length based on the fourth length being less than the second length.

2. The one or more computer-readable hardware storage devices of claim 1, wherein the first ascertained interaction comprises a click on at least one tab or a cursor hovering over at least one tab.

3. The one or more computer-readable hardware storage devices of claim 2, wherein the first ascertained interaction causes a new tab to be opened.

4. The one or more computer-readable hardware storage devices of claim 1, wherein the truncated portion of the URL includes a domain of the URL.

5. The one or more computer-readable hardware storage devices of claim 1, wherein the truncated portion of the URL truncates the URL from the left.

6. A method, implemented at a computer system that includes one or more processors, for distributing a first portion of available space of a control layout area to an address bar that displays a uniform resource locator (URL), and distributing a second portion of the available space to one or more tabs, the address bar and the one or more tabs being disposed along a common line within the control layout area, the method comprising:
  responsive to a first ascertained interaction being with the one or more tabs, performing at least the following:
    determining that the first portion of the available space is to be a first length equaling a predetermined minimum length of the address bar, the minimum width being selected to enable display of a truncated portion of the URL;
    determining that the second portion of the available space is to be a second length equaling the available length less the first length;
    displaying the address bar including the truncated portion of the URL within the first portion of the available space, the address bar having the first length; and
    displaying the one or more tabs within the second portion of the available space, each of the one or more tabs being visibly distributed within the second length, a particular tab of the one or more tabs having a particular length based on being distributed within the second length; and
  responsive to a second ascertained interaction being with the address bar, performing at least the following:
    determining that the first portion of the available space is to be a third length that is greater than the predetermined minimum length of the address bar and that permits display of greater than the truncated portion of the URL;
    determining that the second portion of the available space is to be a fourth length equaling the available length less than the third length, the fourth length being less than the second length;
    displaying the address bar including greater than the truncated portion of the URL within the first portion of the available space, the address bar having the third length; and
    displaying the one or more tabs within the second portion of the available space, each of the one or more tabs being visibly distributed within the fourth length, the particular tab being narrower than the particular length based on the fourth length being less than the second length.

7. The method of claim 6, wherein the first ascertained interaction comprises a click on at least one tab or a cursor hovering over at least one tab.

8. The method of claim 7, wherein the truncated portion of the URL includes a domain of the URL.

9. The method of claim 7, wherein the truncated portion of the URL truncates the URL from the left.

10. The method of claim 7, wherein the first ascertained interaction causes a new tab to be opened.

11. A computer system, comprising:
  one or more processors; and
  memory, coupled to the one or more processors, comprising computer-executable instructions that are executable by the one or more processors to configure a computer system to distribute a first portion of available space of a control layout area to an address bar that displays a uniform resource locator (URL), and distribute a second portion of the available space to one or more tabs, the address bar and the one or more tabs being disposed along a common line within the control layout area, the computer-executable instructions including instructions that are executable to configure the computer system to perform at least the following:
  responsive to a first ascertained interaction being with one or more tabs, perform at least the following:
    determine that the first portion of the available space is to be a first length equaling a predetermined minimum length of the address bar, the minimum width being selected to enable display of a truncated portion of the URL;
    determine that the second portion of the available space is to be a second length equaling the available length less the first length;
    display the address bar including the truncated portion of the URL within the first portion of the available space, the address bar having the first length; and
    display the one or more tabs within the second portion of the available space, each of the one or more tabs being visibly distributed within the second length, a particular tab of the one or more tabs having a particular length based on being distributed within the second length; and
  responsive to a second ascertained interaction being with the address bar, perform at least the following:
    determine that the first portion of the available space is to be a third length that is greater than the predetermined minimum length of the address bar and that permits display of greater than the truncated portion of the URL;

determine that the second portion of the available space is to be a fourth length equaling the available length less than the third length, the fourth length being less than the second length;

display the address bar including greater than the truncated portion of the URL within the first portion of the available space, the address bar having the third length; and display the one or more tabs within the second portion of the available space, each of the one or more tabs being visibly distributed within the fourth length, the particular tab being narrower than the particular length based on the fourth length being less than the second length.

12. The computer system of claim 11, wherein the first ascertained interaction comprises a click on at least one tab or a cursor hovering over at least one tab.

13. The computer system of claim 11, wherein the truncated portion of the URL includes a domain of the URL.

14. The computer system of claim 11, wherein the truncated portion of the URL truncates the URL from the left.

15. The computer system of claim 11, wherein the first ascertained interaction causes a new tab to be opened.

16. The computer system of claim 11, wherein the first ascertained interaction comprises a click on the address bar or a cursor hovering over the address bar.

17. The computer system of claim 11, wherein the one or more tabs being visibly distributed within the second length comprises a plurality of tabs being evenly visibly distributed within the second length, such that each tab is of the particular length.

18. The computer system of claim 17, wherein the one or more tabs being visibly distributed within the fourth length comprises the tabs being evenly visibly distributed within the fourth length, such that each tab is narrower than the particular length.

19. The computer system of claim 11, wherein displaying the address bar including greater than the truncated portion of the URL comprises displaying the entire URL.

20. The computer system of claim 11, wherein the available space of the control layout area varies based on a window size of a web browser.

* * * * *